June 26, 1934.                    A. NEVEU                    1,964,071
FLUID PRESSURE BRAKE
Filed Jan. 10, 1931        2 Sheets-Sheet 1
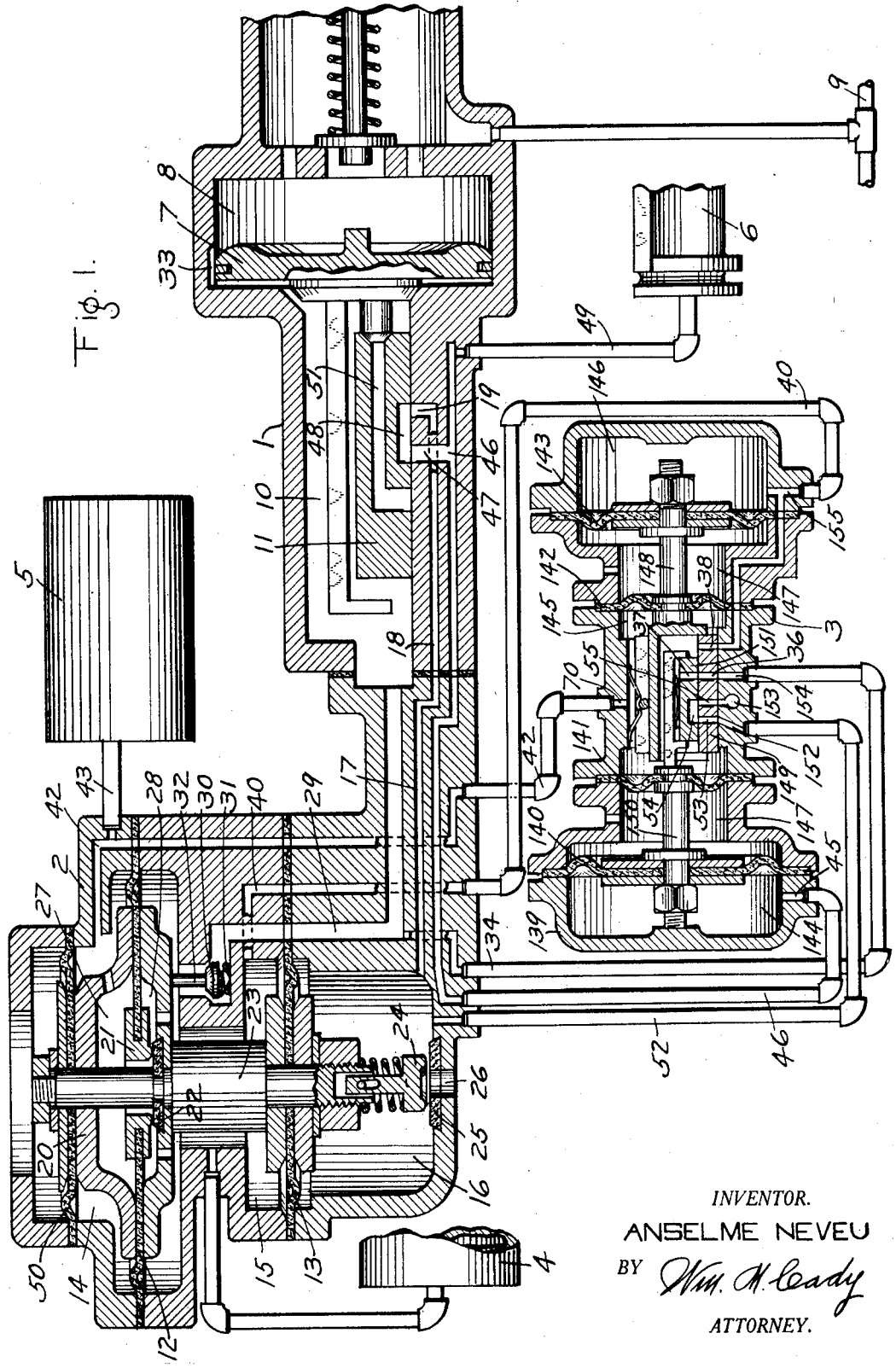
INVENTOR.
ANSELME NEVEU
BY *Wm. N. Cady*
ATTORNEY.

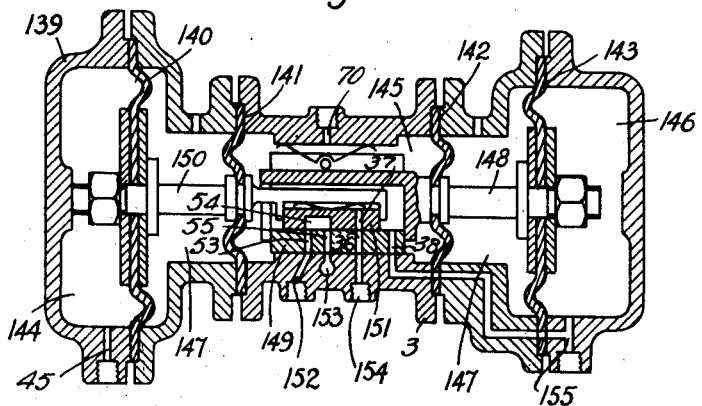

Patented June 26, 1934

UNITED STATES PATENT OFFICE

1,964,071

FLUID PRESSURE BRAKE

Anselme Neveu, Livry-Gargan, France, assignor to The Westinghouse Air Brake Company, Wilmerding, Pa., a corporation of Pennsylvania Application January 10, 1931, Serial No. 507,820
In Great Britain January 18, 1930

17 Claims. (Cl. 303—68)

This invention relates to fluid pressure braking apparatus of the kind in which the supply of fluid under pressure to and its release from the brake cylinder is arranged to be controlled in accordance with variations in brake pipe pressure by means of a controlling valve device preferably embodying a control chamber containing fluid at a substantially constant pressure.

Various forms of controlling valve devices of this character have heretofore been proposed, such, for example, as shown and described in my pending application, Serial No. 507,591, filed January 9, 1931, and these various forms are adapted to effect a graduated release of the brakes in accordance with the degree of restoration of brake pipe pressure and auxiliary reservoir pressure towards the standard pressure obtaining for instance in the control chamber, which is intended to remain substantially constant under all conditions of braking.

In certain circumstances, however, it may happen that the restoration of brake pipe pressure to the full extent possibly fails to effect absolute equality between the auxiliary reservoir pressure and standard or control chamber pressure, owing, for instance, to the control chamber having become overcharged or due to the restored brake pipe pressure being different at different times. Under these conditions, difficulty may occur in effecting the final stage of the release of the brakes, that is to say, in effecting the final release to the atmosphere of the fluid contained in the brake cylinder at the end of the graduated release.

The present invention has for its object to overcome this disadvantage and according to the principal feature of the invention, improved means are provided adapted to control communication between the brake cylinder and the atmosphere in such a manner that this communication is established as soon as a predetermined relation exists between the pressures in the brake cylinder, control reservoir and auxiliary reservoir, while for a different predetermined relation, the communication above referred to is interrupted.

In the accompanying drawings; Fig. 1 is a diagrammatic view, mainly in section, of a fluid pressure brake equipment embodying one form of my invention; Fig. 2 is a diagrammatic view of the final release valve device shown in Fig. 1; Fig. 3 is a diagrammatic view of another form of final release valve device; and Fig. 4 is a diagrammatic view of still another form of final release valve device.

As shown in the drawings, the fluid pressure brake equipment comprises a triple valve device 1, a graduated release valve device 2, a final release valve device 3, an auxiliary reservoir 4, a control reservoir 5, and a brake cylinder 6.

The triple valve device 1 comprises a piston 7, having a chamber 8 at one side connected to the usual brake pipe 9, and a chamber 10 at the other side containing a slide valve 11 adapted to be operated by said piston.

The graduated release valve device 2 is preferably mounted on one end of the triple valve device 1 and comprises a casing divided into three chambers or compartments by means of a large diaphragm 12 and a small diaphragm 13. The chamber 14 above the diaphragm 12 is permanently in communication with a control reservoir 5, while the middle chamber 15 between the diaphragms 12 and 13 is permanently in communication with the auxiliary reservoir 4. The lower chamber 16 communicates by means of a passage 17 in the casing of the graduated release valve device with a special passage 18 formed in the triple valve casing and leading to the triple valve exhaust port 19.

Mounted upon the upper diaphragm 12 is an internal casing or box 20, the diaphragm 12 extending within the interior of the box 20 and being provided with an annular valve member 21 carried by said diaphragm and adapted normally to engage with a gasket 22 mounted in the base of the box 20. The box 20 is secured to a valve stem 23 traversing and secured to the lower diaphragm 13, the portion of the stem 23 projecting below the diaphragm 13 carrying a spring controlled valve member 24, adapted to engage with a gasket 25 surrounding an opening 26 in the base of the lower chamber 16.

It will be seen that the central portion of the diaphragm 12 divides the interior of the box 20 into an upper chamber 27 communicating with the chamber 14 leading to the control reservoir 5, and a lower chamber 28 communicating with chamber 15. The chamber 15 is arranged to communicate with a passage 29 leading to the valve chamber 10 of the triple valve device 1, this communication being controlled by a check valve 30 adapted to be held closed by a light spring 31. The valve 30 is provided with an upwardly projecting stem 32 adapted, under certain conditions, to be engaged by the base of the box 20, so as to hold the valve 30 open.

The final release valve device 3 comprises a casing 139, divided internally into a number of chambers by means of flexible diaphragms 140, 141, 142 and 143. The chamber 144 on one side of the diaphragm 140 is at all times in communication with the brake cylinder 6, the middle chamber 145 between diaphragms 141 and 142 being at all times in communication with the control reservoir 5, and chamber 146 at one side of the diaphragm 143 is in constant communication with the auxiliary reservoir 4. The other chambers 147 are in open communication with the atmosphere. The diaphragms 142 and 143 are provided with a stem 148 adapted to actuate a slide valve 149, and the diaphragms 140 and 141 are provided with a stem 150 adapted to actuate a slide valve 151 superposed upon the slide valve 149.

In operation, the various parts of the apparatus are shown in the position they would occupy after the release of the brakes had been effected and while the auxiliary reservoir 4 is being recharged with fluid under pressure from the brake pipe 9.

The triple valve piston 7 is in release position and fluid is being supplied from the brake pipe 9, through the piston chamber 8 and feed groove 33, to valve chamber 10. From valve chamber 10 fluid flows through passage 29, past the open valve 30 to chamber 15 and thence to the auxiliary reservoir 4. Fluid is also being supplied to the auxiliary reservoir 4 from passage 29 by way of passage and pipe 34, passage 154 in the final release valve device, port 36 in slide valve 149, port 37 in slide valve 151, valve chamber 145, port 38 in slide valve 149, passage 155, pipe and passage 40 and chamber 15 in the graduated release valve device.

Chamber 145 in the final release valve device being supplied with fluid under pressure as just described, fluid under pressure flows from thence through passage 70 and pipe and passage 42 to chamber 14 in the graduated release valve device, and also from passage 42 through pipe 43 to the control reservoir 5. Chamber 146 in the final release valve device is charged with fluid from passage 155 at the same time as the auxiliary reservoir 4 is charged with fluid supplied through said passage. Thus the chambers 146 and 145 are charged with fluid at the same pressure, but since the diaphragm 143 is of greater area than diaphragm 142, the pressure in chamber 146, acting on the differential areas of diaphragms 142 and 143 urges and maintains said diaphragms and the slide valve 151 in the release position shown in the drawings.

Chamber 144 at the outer side of diaphragm 140 is open to the atmosphere through passage 45 in the final release valve device, pipe and passage 46, passage 47, cavity 48 in the triple valve slide valve 11, passage 19, chamber 16 in the graduated release valve device, past the valve 24 and through passage 26. This permits the control reservoir pressure, acting in chamber 145, to maintain the diaphragms 140 and 141, and the slide valve 151 in the position shown in the drawings. The brake cylinder 6 is open to the atmosphere through pipe 49 and passages 46 and 47, and release cavity 48 in the triple valve slide valve 11.

With the auxiliary reservoir 4 and chamber 15 charged to the normal value and equal to the pressure of fluid in the control reservoir 5, and chamber 14, the opposing pressures on diaphragm 12 are equalized. The upper diaphragm 50 is, however, of greater area than the lower diaphragm 13, so that the control reservoir pressure in chamber 14, acting on the difference in areas of said diaphragms, moves the diaphragms 12, 13 and 50, and stem 23 upwardly a small extent so as to permit the valve 30 to close under the action of spring 31.

When an application of the brakes is effected in the ordinary manner by reducing the pressure in the brake pipe 9, the triple valve piston 7 and slide valve 11 are moved toward the right, thereby cutting off communication between the brake cylinder passage 47 and the exhaust passage 19 and establishing communication between the valve chamber 10 and the brake cylinder 6 through port 51 in the slide valve 11.

Fluid under pressure is thereupon supplied from the valve chamber 10 to the brake cylinder 6 by way of passages 47 and 46 and pipe 49. Owing to the consequent reduction in pressure in valve chamber 10, the valve 30 is opened and permits flow of fluid from the auxiliary reservoir 4 by way of chamber 15 to supply the brake cylinder 6.

The pressure of fluid in diaphragm chamber 146 reduces through passage 155 and pipe and passage 40 with auxiliary reservoir pressure and when a certain reduction is thus effected, the control reservoir pressure in valve chamber 145 shifts said diaphragms and the slide valve 149 toward the right hand so as to lap passages 155 and 154 and thereby bottle up the pressure in valve chamber 145 and the control reservoir 5, so that it will remain substantially constant for controlling the operation of the graduated release valve device 2 and final release valve device 3 in effecting a release of the brakes, as will be hereinafter described.

As fluid under pressure is supplied to passage 46 and from thence to the brake cylinder 6, fluid flows from passage 46 through passage 45 in the final release valve device to chamber 144 and acts on the diaphragm 140. Upon obtaining a predetermined low pressure in chamber 144, the diaphragm 140 is deflected and shifts the slide valve 151 towards the right against the opposing control reservoir pressure in chamber 145 acting on the smaller diaphragm 141. This movement of the slide valve 151 is relative to the slide valve 149 and so positions slide valve 151 that it will cooperate with the slide valve 149, in effecting a release of the brakes, to prevent the final release of fluid under pressure from the brake cylinder before a predetermined relation is obtained between the pressures in the control reservoir 5, the auxiliary reservoir 4 and the brake cylinder 6, as will be hereinafter explained.

Owing to the reduction in auxiliary reservoir pressure due to the flow of fluid to the brake cylinder 6, the control reservoir pressure in chamber 14, acting on the upper side of diaphragm 12, predominates over the reduced auxiliary reservoir pressure in chamber 15 and causes the diaphragms 12, 13 and 50 to move downwardly, carrying with them the stem 23 so as to cause the valve member 24 to engage gasket 25 and thereby close communication from chamber 16 to the atmosphere through opening 26. This downward movement of the diaphragms also causes the box 20 to engage with the stem 32 of the valve 30 and hold this valve in its open position, as shown in Fig. 1.

In order to effect a release of the brakes after an application, fluid under pressure is supplied to brake pipe 9 and piston chamber 8 and acts on piston 7 to return said piston and the slide valve 11 to release position shown in Fig. 1, in which position communication is established between the brake cylinder 6 and the triple valve exhaust port 19.

Fluid under pressure consequently flows from the brake cylinder 6 to chamber 16 in the graduated release valve device 2 by way of pipe 49, passages 46 and 47, cavity 48 in the triple valve slide valve 11 and passages 19, 18 and 17.

At the same time as the brake cylinder 6 is connected to chamber 16 of the graduated release valve device, fluid under pressure is supplied from the brake pipe 9 to the auxiliary reservoir 4 by way of piston chamber 8, feed groove 33, valve chamber 10, passage 29, past valve 30 and through chamber 15.

When the auxiliary reservoir pressure acting in chamber 15 is thus increased a certain degree, the combined action of it on diaphragms 12 and 13 and brake cylinder pressure in chamber 16 on diaphragm 13 overcomes the opposing force of control reservoir pressure in chamber 14 acting on diaphragms 12 and 50, and causes the diaphragms 12, 13 and 50 to move upwardly and thereby raise the valve member 24 away from the gasket 25 and at the same time permit spring 31 to seat valve 30 and cut off the supply of fluid from passage 29 to chamber 15 and the auxiliary reservoir 4.

With the valve member 24 raised away from gasket 25, fluid under pressure is released from the brake cylinder 6 by way of pipe 49, passages 46 and 47, cavity 48 in the triple valve slide valve, the triple valve exhaust passage 19, passages 18 and 17, chamber 16 and to the atmosphere through opening 26.

Fluid will thus be released from the brake cylinder until the brake cylinder pressure in chamber 16 is reduced sufficiently to permit the increased auxiliary reservoir pressure in chamber 15 and constant control reservoir pressure in chamber 14 to move the diaphragms 12, 13 and 50 downwardly and shift the valve member 24 into engagement with the gasket 25. At the same time as the release of fluid from the brake cylinder is thus interrupted, the valve 30 is unseated to permit a further increase in auxiliary reservoir pressure followed by a further and proportionate release of fluid from the brake cylinder 6.

It will be understood that since the opening and closing movements of the valve member 24 are dependent upon the relation of brake cylinder pressure to restored auxiliary reservoir pressure, the graduation of the release of brakes will be accurately controlled in accordance with the degree of restoration of brake pipe pressure towards its normal value.

The graduated release of the brakes continues in the manner above described until the brake cylinder pressure is reduced to a predetermined low degree relative to the pressure in the control reservoir, and also until the auxiliary reservoir pressure is restored to within a predetermined degree of the control reservoir pressure, at which time the final release valve device operates, independently of the valve member 24, to establish an atmospheric connection to the brake cylinder 6, so as to ensure a complete release of the brakes.

In effecting a release of the brakes after an application, the final release valve device 3 remains in the position to which it was moved in effecting an application of the brakes, until the brake cylinder pressure acting in chamber 144 is reduced to a predetermined low degree relative to control reservoir pressure acting in chamber 145 and until the auxiliary reservoir pressure acting in diaphragm chamber 146 is increased to within a predetermined degree of the control reservoir pressure acting in chamber 145.

When the brake cylinder pressure is reduced to a predetermined degree, the control reservoir pressure in chamber 145, acting on diaphragm 141, moves the diaphragms 141 and 140 and slide valve 151 to the position shown in Fig. 1 of the drawings, and when the auxiliary reservoir pressure in chamber 146 is increased to a predetermined degree, it overcomes the opposing control reservoir pressure in chamber 145 and moves the diaphragms 143 and 142 and slide valve 149 to the position shown in Fig. 1.

With the final release valve slide valves 149 and 151 positioned as in Fig. 1, fluid remaining in the brake cylinder 6 and supplied to chamber 16 of the graduated release valve device, is vented to the atmosphere through pipe and passage 52, passage 152, port 53 in the slide valve 149, cavity 54 in the slide valve 151, port 55 in the slide valve 149, and through the atmospheric passage 153. At the same time, port 36 in the slide valve 149 registers with port 37 in the slide valve 151 and passage 154, so that fluid under pressure is supplied from valve chamber 10 to the control reservoir 5 and to the auxiliary reservoir 4 independently of the valve 30, as hereinbefore described.

Upon a complete release of fluid under pressure from the brake cylinder 6 and chamber 16 and a complete charge of the auxiliary reservoir 4, the auxiliary reservoir pressure in chamber 15 acting on diaphragms 12 and 13 is overcome by the control reservoir pressure in chamber 14 acting on diaphragms 12 and 50, so that said diaphragms are moved upwardly a slight extent so as to permit valve 30 to seat under the action of spring 31.

It will now be evident that the final release of fluid under pressure from the brake cylinder 6 will be effected by operation of the final release valve device 3 only after the brake cylinder pressure is reduced to a predetermined degree relative to the pressure in the control reservoir and the auxiliary reservoir pressure is increased to a predetermined degree relative to the pressure in the control reservoir.

If for any reason the pressure in the control reservoir 5 and chamber 27 of the graduated release valve device should fall below the auxiliary reservoir pressure in chamber 28, the central portion of the diaphragm 12, within the box 20, will be moved upwardly and raise the valve member 21 out of engagement with the gasket 22 and thus permit recharging of the control reservoir from the auxiliary reservoir, the valve member 21 and its cooperating gasket 22 thus serving as an automatic check valve for this purpose.

In Fig. 3 of the drawings is shown another form of final release valve device which differs from that shown in Fig. 1, in that the final release of fluid under pressure from the brake cylinder is jointly controlled by one device subject to the opposing pressures of the brake cylinder 6 and auxiliary reservoir 4 and another device subject to the opposing pressures of the control reservoir 5 and brake cylinder 6.

In the device shown in Fig. 3, a slide valve 60 is disposed in chamber 156, which is at all times open to the auxiliary reservoir 4, and another slide valve 62 is disposed in chamber 157 which is at all times open to the control reservoir 5. The slide valve 60 is adapted to be controlled by the diaphragms 140 and 141, while the slide valve 62 is adapted to be controlled by the diaphragms 142 and 143.

In operation, when an application of the brakes is effected, the pressure in chamber 156 reduces as fluid under pressure is supplied from the auxiliary reservoir 4 to the brake cylinder, and fluid at the pressure supplied to the brake cylinder flows through passage 45 to chamber 144. When the brake cylinder pressure thus obtained in chamber 144 increases to a predetermined degree relative to the reducing auxiliary reservoir pressure in chamber 156, the diaphragm 140 is deflected towards the right and shifts the slide valve 60 so as to disconnect passage 152 from a passage 63, and to lap passage 64.

Fluid at brake cylinder pressure flows from passage 45 through a passage 61 to diaphragm chamber 158 and when the brake cylinder pressure in said chamber is increased above a predetermined degree, the diaphragm 143 is operated against the opposing control reservoir pressure in chamber 157 to shift the slide valve 62 toward the left so as to lap passage 154 and disconnect passage 63 from passage 153.

To effect a release of the brakes after an application, the triple valve device 1 and graduated release valve device 2 operate in the same manner as hereinbefore described to release fluid under pressure from the brake cylinder 6 and to supply fluid under pressure to the auxiliary reservoir 4. When the brake cylinder pressure in chamber 144 is thus reduced to a predetermined low degree and the auxiliary reservoir pressure in chamber 156 is increased to a predetermined degree, a relation is obtained between said pressures which deflects the diaphragm 140 and moves the slide valve 60 to the position shown in Fig. 3, in which cavity 54 connects passage 152 to passage 63, and passage 64 is opened to the valve chamber 156.

When the brake cylinder pressure in chamber 158 is reduced to a predetermined low degree relative to the control reservoir pressure in chamber 157, the diaphragm 142 is operated to shift the slide valve 62 to the position shown in Fig. 3, in which a cavity 65 connects passage 63 to atmospheric passage 153 and passage 154 is opened to valve chamber 157.

With the slide valves 60 and 62 both moved to the position shown in Fig. 3, the final release of fluid from the brake cylinder 6 is permitted to occur by way of chamber 16 in the graduated release valve device, passage and pipe 52, passage 152, cavity 54 in the slide valve 60, passage 63, cavity 65 in the slide valve 62 and atmospheric passage 153. It will be noted that since the final release of fluid from the brake cylinder is controlled by both of the slide valves 60 and 62, that such release cannot occur until the slide valves are properly positioned independently of each other as controlled by the relation between the brake cylinder pressure and the pressure in the auxiliary reservoir and control reservoir.

When the slide valves 60 and 62 are moved to the position shown in Fig. 3, communication is opened between passage 154, which is supplied with fluid under pressure from the triple valve chamber 10, and valve chambers 156 and 157, which are connected with the auxiliary reservoir 4 and control reservoir 5, respectively. Through this communication the auxiliary reservoir 4 is permitted to completely charge and an equality of pressures in the brake system is obtained.

The modified form of final release valve device shown in Fig. 4 is very similar to the form shown in Fig. 1 comprising two slide valves 149 and 151, movable relative to each other, the slide valve 151 being mounted on the slide valve 149. The function of the slide valves 149 and 151 is the same as in the device shown in Fig. 1, but in operation the direction of movement of slide valve 149 is reversed from that in the device shown in Fig. 1.

When an application of the brakes is effected, the pressure in chamber 66 reduces with auxiliary reservoir pressure, while the pressure in chamber 144 increases with brake cylinder pressure, and upon obtaining a predetermined relation between these pressures the slide valve 151 is moved toward the right. When the auxiliary reservoir pressure in chamber 66 is reduced a predetermined degree below the control reservoir pressure in chamber 67, the slide valve 149 is moved toward the left.

In effecting a release of the brakes, fluid is vented from chamber 144 with the venting of fluid from the brake cylinder 6, and the pressure of fluid in chamber 66 is increased with auxiliary reservoir pressure. When a predetermined relation between the pressures in chambers 144 and 66 is thus obtained, the slide valve 151 is moved to the position shown in Fig. 4. When a predetermined relation is obtained between the auxiliary reservoir pressure in chamber 66 and the control reservoir pressure in chamber 67, the slide valve 149 is moved to the position shown in Fig. 4. With both of the slide valves 149 and 151 in the position shown in Fig. 4, communication is established for effecting the final release of fluid under pressure from the brake cylinder and for permitting an equalization of pressures in the brake system in the same manner as hereinbefore described in connection with the apparatus shown in Fig. 1.

I have shown and described three different forms of final release valve device adapted to be associated with a triple valve device and graduated release valve device for ensuring a complete release of fluid under pressure from the brake cylinder by operating to vent fluid under pressure from the brake cylinder after the brake cylinder pressure is reduced to a predetermined low degree by the operation of the graduated release valve device.

The operation of each form of final release valve device is controlled by the opposing pressures of the auxiliary reservoir, the control reservoir and the brake cylinder, taken in pairs, so as to ensure a substantially complete recharge and equality of pressures in the brake equipment at the time fluid is completely released from the brake cylinder.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means controlled by the pressures in said reservoirs and brake cylinder and operative when the pressure in said brake cylinder is reduced to a predetermined degree to establish another communication through which fluid under pressure is released from said brake cylinder.

2. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, valve means operative when the pressure in said brake cylinder is reduced to a predetermined degree for releasing fluid under pressure from the brake cylinder, and operating means for said valve means including an element subject to the opposing pressures of the brake cylinder and control reservoir, and another element subject to the opposing pressures of the auxiliary reservoir and control reservoir.

3. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, valve means operative when the brake cylinder pressure is reduced to a predetermined degree to release fluid under pressure from the brake cylinder, and operating means for said valve means including an element subject to the opposing pressures of the brake cylinder and auxiliary reservoir and another element subject to the opposing pressures of the brake cylinder and control reservoir.

4. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said said brake cylinder to effect a release of the brakes, valve means operative when the brake cylinder pressure is reduced to a predetermined degree to release fluid under pressure from the brake cylinder, and operating means for said valve means including an element subject to the opposing pressures of the brake cylinder and auxiliary reservoir and another element subject to the opposing pressures of the auxiliary reservoir and control reservoir.

5. In a fluid pressure brake, the combination with a brake pipe, a brake cylinder, an auxiliary reservoir and a control reservoir, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is vented from said brake cylinder to effect a release of the brakes, and valve means controlled by the pressures in said reservoirs and brake cylinder and operative in effecting an application of the brakes to isolate said control reservoir and operative, when the brake cylinder pressure is reduced to a predetermined degree in effecting a release of the brakes, to connect said reservoirs and to establish another communication through which fluid under pressure is vented from said brake cylinder.

6. In a fluid pressure brake, the combination with a brake pipe, a brake cylinder, an auxiliary reservoir and a control reservoir, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is vented from said brake cylinder to effect a release of the brakes, valve means operative in effecting an application of the brakes to isolate said control reservoir and operative, when the brake cylinder pressure is reduced to a predetermined degree in effecting a release of the brakes, to connect said reservoirs and to establish another communication through which fluid under pressure is vented from said brake cylinder, and operating means for said valve means including an element subject to the opposing pressures of the brake cylinder and control reservoir, and an element subject to the opposing pressures of the auxiliary reservoir and control reservoir.

7. In a fluid pressure brake, the combination with a brake pipe, a brake cylinder, an auxiliary reservoir and a control reservoir, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is vented from said brake cylinder to effect a release of the brakes, valve means operative in effecting an application of the brakes to isolate said control reservoir and operative in effecting a release of the brakes to connect said reservoirs and to establish another communication through which fluid under pressure is vented from said brake cylinder, and operating means for said valve means including an element subject to the opposing pressures of the brake cylinder and auxiliary reservoir and an element subject to the opposing pressures of the brake cylinder and control reservoir.

8. In a fluid pressure brake, the combination with a brake pipe, a brake cylinder, an auxiliary reservoir and a control reservoir, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is vented from said brake cylinder to effect a release of the brakes, valve means operative in effecting an application of the brakes to isolate said control reservoir and operative in effecting a release of the brakes to connect said reservoirs and to establish another communication through which fluid under pressure is vented from said brake cylinder, and operating means for said valve means including an element subject to the opposing pressures of the brake cylinder and auxiliary reservoir and an element subject to the opposing pressures of the auxiliary reservoir and control reservoir.

9. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means controlled by the pressures in said reservoirs and brake cylinder and operative, in effecting a release of the brakes, when a predetermined relation is obtained between the pressure in said control reservoir relative to the pressures in said auxiliary reservoir and brake cylinder to establish another communication through which fluid under pressure is released from said brake cylinder.

10. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means controlled by the pressures in said reservoirs and brake cylinder and operative, in effecting a release of the brakes, when the brake cylinder pressure bears a predetermined relation to the pressure of fluid in said control reservoir and a predetermined relation to the pressure of fluid in said auxiliary reservoir to establish another communication through which fluid under pressure is released from said brake cylinder.

11. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means controlled by the pressures in said reservoirs and brake cylinder and operative, in effecting a release of the brakes, when the auxiliary reservoir pressure bears a predetermined relation to the brake cylinder pressure and a predetermined relation to control reservoir pressure to establish another communication through which fluid under pressure is released from said brake cylinder.

12. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means operative in effecting a release of the brakes to establish another communication through which fluid under pressure is released from said brake cylinder, said valve means comprising two relatively movable slide valves cooperative to control said other communication and contained in a chamber communicating with said control reservoir, a pair of spaced movable abutments subject to the opposing pressures of said chamber and brake cylinder for operating one of said slide valves, and another pair of spaced movable abutments subject to the opposing pressures of said chamber and auxiliary reservoir for operating the other of said slide valves.

13. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means operative in effecting a release of the brakes to establish another communication through which fluid under pressure is released from said brake cylinder, said valve means comprising two relatively movable slide valves cooperative to control said other communication and contained in a chamber communicating with said auxiliary reservoir, a pair of spaced movable abutments subject to the opposing pressures of said chamber and the brake cylinder for operating one of said slide valves, and another pair of spaced movable abutments subject to the opposing pressures of said chamber and the control reservoir for operating the other of said slide valves.

14. In a fluid pressure brake, the combination with a brake pipe, a brake cylinder, an auxiliary reservoir and a control reservoir charged with fluid at the pressure carried in said brake pipe, of a brake controlling valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is released from said brake cylinder to effect a release of the brakes, and valve means operative in effecting a release of the brakes to establish another communication through which fluid under pressure is released from said brake cylinder, said valve means comprising a slide valve contained in a chamber open to the auxiliary reservoir, a pair of spaced movable abutments subject to the opposing pressures of said chamber and brake cylinder for controlling said slide valve, another slide valve cooperative with the first mentioned slide valve to control said other communication and contained in a chamber open to the control reservoir, and a pair of spaced movable abutments subject to the opposing pressures of the last mentioned chamber and the brake cylinder for controlling the last mentioned slide valve.

15. In a fluid pressure brake, the combination with a brake pipe, a brake cylinder, an auxiliary reservoir and a control reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to establish a communication through which fluid under pressure is vented from said brake cylinder to effect a release of the brakes, means controlled by the pressure of fluid in said control reservoir, the auxiliary reservoir and said brake cylinder for controlling the supply of fluid from said triple valve device to said auxiliary reservoir and operative to vent fluid under pressure from said brake cylinder through said communication in accordance with the increase in auxiliary reservoir pressure, and valve means controlled by the opposing pressures of said reservoirs and brake cylinder, taken in pairs, and operative when the brake cylinder pressure is reduced to a predetermined degree to vent fluid under pressure from said brake cylinder through said communication independently of said means.

16. In a fluid pressure brake, the combination with a brake pipe, a brake cylinder, an auxiliary reservoir and a control reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to establish a communication through which fluid under pressure is vented from said brake cylinder to effect a release of the brakes, means controlled by the pressure of fluid in said control reservoir, the auxiliary reservoir and said brake cylinder for controlling the supply of fluid from said triple valve device to said auxiliary reservoir and operative to vent fluid under pressure from said brake cylinder through said communication in accordance with the increase in auxiliary reservoir pressure, and valve means controlled by the opposing pressures of said reservoirs and brake cylinder, taken in pairs, and operative when the brake cylinder pressure is reduced to a predetermined degree to vent fluid under pressure from said brake cylinder through said communication and to supply fluid under pressure from said triple valve device to said auxiliary reservoir independently of said means.

17. In a fluid pressure brake, the combination with a brake pipe, a brake cylinder, an auxiliary reservoir and a control reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to establish a communication through which fluid under pressure is vented from said brake cylinder to effect a release of the brakes, means controlled by the pressure of fluid in said control reservoir, the auxiliary reservoir and said brake cylinder for controlling the supply of fluid from said triple valve device to said auxiliary reservoir and operative to vent fluid under pressure from said brake cylinder through said communication in accordance with the increase in auxiliary reservoir pressure, and valve means controlled by the opposing pressures of said reservoirs and brake cylinder, taken in pairs, and operative when the brake cylinder pressure is reduced to a predetermined degree to vent fluid under pressure from said brake cylinder through said communication and to establish a communication through which fluid under pressure is supplied from said triple valve device to said auxiliary reservoir and equalizes with said control reservoir, independently of said means.

ANSELME NEVEU.